United States Patent [19]

McIntosh

[11] Patent Number: 4,662,893
[45] Date of Patent: May 5, 1987

[54] HYDRAULIC WASTE PROPELLANT MACERATOR AND METHOD OF USE

[75] Inventor: Meldon J. McIntosh, North Ogden, Utah

[73] Assignee: Morton Thiokol Inc., Chicago, Ill.

[21] Appl. No.: 659,796

[22] Filed: Oct. 11, 1984

[51] Int. Cl.⁴ ............................................. B01D 11/02
[52] U.S. Cl. ................................... 23/293 R; 241/1; 241/74; 422/270; 422/272; 422/273; 422/276; 210/174
[58] Field of Search ............ 23/293 R; 210/173, 174; 422/255, 258, 259, 260, 261, 267, 268, 269, 273, 274, 276, 284, 285, 286, 290, 291, 275, 264, 270, 271, 272, 278, 281; 423/32; 23/302 R, 302 A, 302 J; 241/1, 74, 12, 17

[56] References Cited

U.S. PATENT DOCUMENTS

| | | | |
|---|---|---|---|
| 299,637 | 6/1884 | Griffin | 422/285 |
| 710,495 | 10/1902 | Muffly | 422/270 |
| 889,159 | 5/1908 | Trump | 422/267 |
| 3,440,096 | 4/1969 | Scott | 134/34 |
| 3,450,526 | 6/1969 | Davis | 423/32 |
| 3,451,789 | 6/1969 | McIntosh | 23/302 R |
| 3,985,572 | 10/1976 | Petermann et al. | 134/22.18 |
| 4,198,209 | 4/1980 | Shaw et al. | 23/302 R |
| 4,229,182 | 10/1980 | Shaw | 23/293 R |
| 4,230,675 | 10/1980 | Yarbro | 422/275 |
| 4,257,563 | 3/1981 | Henrich | 241/17 |
| 4,353,720 | 10/1982 | Margraf | 422/234 |

Primary Examiner—David L. Lacey
Attorney, Agent, or Firm—James C. Simmons; Gerald K. White

[57] ABSTRACT

A method and apparatus for hydraulically macerating and recovering soluble component from a solid material such as waste solid propellant that is semihard. The solid material is fed into a perforated enclosure where it is held until it is macerated such that it can pass through perforations in the enclosure. While held in the enclosure, the solid material is agitated and exposed to jets of liquid solvent under a pressure which is equal to at least about 1000 psig to thereby macerate the solid material and force it through the perforations and to dissolve soluble component such as ammonium perchlorate from solid propellant. In one embodiment, the propellant residue is conveyed to a residue discharge end of the apparatus by a sloping helical conveyor. The helical conveyor provides individual contact stages for counter-current extraction and washing of ammonium perchlorate from the residue with recycled solvent.

16 Claims, 12 Drawing Figures

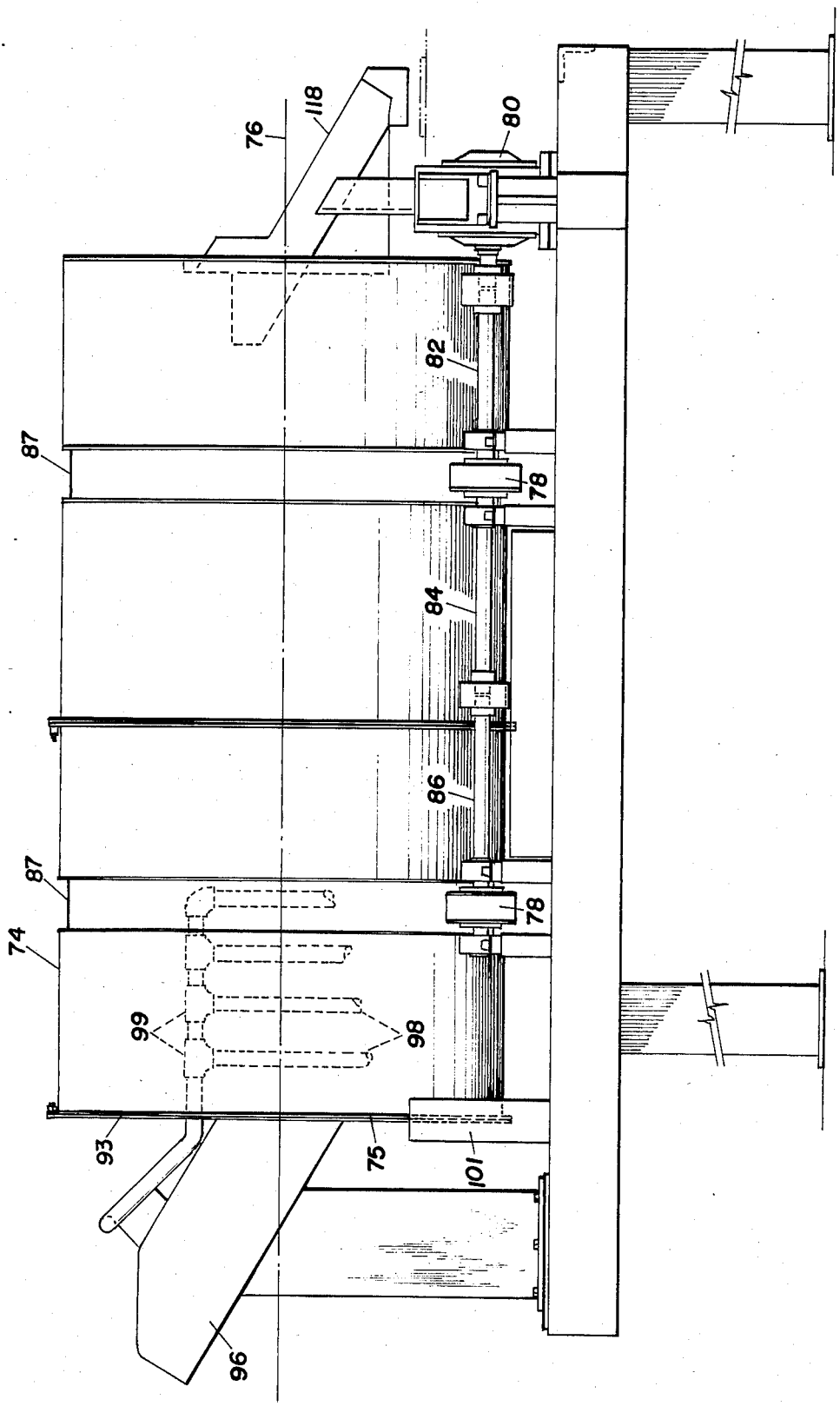

HYDRAULIC WASTE PROPELLANT MACERATOR AND METHOD OF USE

The United States Government has rights in this invention pursuant to Contract F33615-81-C-5125 awarded by the Department of the Air Force.

BACKGROUND OF THE INVENTION

1. Field of the Invention

The present invention relates to a hydraulic waste propellant macerator for the recovery of oxidizers from waste solid propellants, and more particularly, to a hydraulic macerator for shredding waste solid propellants wherein such oxidizers are interspersed in water insoluble matrices.

2. Description of the Prior Art

In the manufacture of solid propellant rocket motors, uncured propellants in liquid form are poured into motor cases and thereafter cured to the solid state in situ. In order to compensate for the propellant volume loss which occurs during curing, an amount of uncured propellant greater than that which will be required for the charge is generally placed in the motor case, the excess being removed after the propellant has been cured. This solid propellant which is removed from rocket motor cases, as well as overage or surplus propellant and propellant scrapped for other reasons, has heretofore been discarded as waste because its physical characteristics, particularly its extremely high flammability and rubbery consistency, have been regarded as prohibitive of any recovery of the propellant components. Since solid propellant rocket motors are produced in large numbers, a considerable amount of waste propellant is accumulated, with a resultant loss of large quantities of expensive propellant components, such as oxidizers, that could be reused if they were recoverable. Furthermore, because of their highly combustible and sometimes even explosive nature, waste solid propellants cannot be handled as readily as most waste materials but ordinarily must be carefully burned, a disposal method attended with considerable hazard, expense, and inconvenience.

Over the past twenty years incinerators have been developed for the disposal of waste propellants, explosives and pyrotechnics. The furnaces are generally of the rotary kiln incinerator type or the fluidized bed incinerator type. Additionally, large quantities of waste propellant have been and are now being burned in open burning pits. Due to increasing environmental pressure, however, many propellant producers are either currently burning waste propellant and scrubbing the combustion gases or are planning on, or will be required, to do so in the future. The passage of strict environmental protection laws in recent years has made open pit burning unacceptable in many localities. It is noted that the incineration processes referred to above must be equipped with emission control devices, and while generally meeting air quality standards, still demand relatively large capital investments for equipment. Thus incineration operating costs are high compared to open pit burning.

Interest in recent years has shifted to the recovery and reuse of ingredients from waste propellants. This approach has the potential for achieving acceptable air quality standards as well as offsetting operational costs through reuse and/or commercial markets for the reclaimed products. However, the propellant ingredient reclamation technology of the prior art has not developed to the point where it has become a viable alternative to open pit burning or controlled incineration for disposal of waste and surplus solid propellant.

A method of removing, by leaching, ammonium perchlorate (AP) from composite propellants is taught in U.S Pat. No. 3,451,789, issued to Meldon J. McIntosh on June 24, 1969 for an oxidizer recovery process. In this process, propellant removed from rocket motors is chopped by a wet rotating knife type machine into small chunks which are leached with water. The McIntosh patent also considers the use of a ball mill or various other types of pulverizing or grinding machines that permit wet size reduction of the solid propellant. This patent, however, contains no further disclosure or suggestion concerning the manner of effecting wet size reduction of the solid propellant. In order to obtain more than 25% to 30% of the available oxidizer under the McIntosh teachings, the agglomerate propellant requires continuous tearing and chopping apart in a leach solution. This, in turn, requires a long time for processing and a large expenditure of power to run the chopper while extracting the AP.

In U.S. Pat. No. 4,198,209 to Graham C. Shaw and Meldon J. McIntosh issued Apr. 15, 1980 for a process for leaching of AP from propellant, enhanced recovery of ammonium perchlorate from a waste solid rocket propellant is effected by means of leaching shredded particles of the propellant with an aqueous leach solution containing a low concentration of surface active agent while stirring the suspension. This patent did not improve on the teachings of U.S. Pat. No. 3,451,789 for shredding the waste propellant, indicating a preference for a wet rotating knife type shredder and noting that a ball mill, roller mill or pulverizer or grinding machine may also be used.

Similarly, U.S. Pat. No. 4,229,182 issued to Graham C. Shaw on Oct. 21, 1980 for recovery of aluminum from composite propellants, teaches the recovery of aluminum from solid rocket propellant containing a small amount of oxidizer. The recovery is effected by depolymerizing and dissolving propellant binder containing functional or hydrolyzable groups in a solution of sodium methoxide in an alcohol solvent optionally containing an aliphatic or aromatic hydrocarbon cosolvent and then filtering the solution to recover substantially all the aluminum in active form. This patent neither teaches, nor suggests, any means for shredding or chopping propellant for processing.

What is needed is an efficient means for shredding the waste solid propellant to increase the specific area so that when the shredded propellant is contacted with water it readily dissolves for expeditious recovery of ammonium perchlorate. The procedures proposed in the prior art for effecting shredding of the waste propellant, as noted above, are mechanical shredding and mechanical slicing. The mechanical slicing processes are similar to existing propellant machining and milling technology. In this process, bulk propellant samples are fed into a rotating cutter blade. The chip size produced and the production rate are controlled by the blade height, feed rate and blade rotational speed. Mechanical shredding, however, is not accompanied by any significant amount of ammonium perchlorate dissolution. The mechanical slicing process relies on industry experience in wire cutting and guillotine cutting of propellant samples. In mechanical slicing, a bulk propellant sample is forced past a series of parallel blades or wires by a hydraulic ram. The spacing between adjacent blades or wires determines the thickness of the slices produced. Mechanical slicing produces propellant slices which are generally too coarse for expeditious processing. In addition, the mechanical slicing process is not accompanied by waste propellant dissolution.

As mentioned above, the problem of disposing of waste solid propellant and its cost is of considerable magnitude. Economic recovery of the waste propellant ingredients would save energy, reduce cost, and eliminate the undesirable and hazardous open pit burning and costly incineration procedure. Therefore, there is a need and a demand for an economically and environmentally acceptable method of and apparatus for disposing of waste solid propellant in such a manner as to enable an efficient recovery of valuable ingredients thereof, and in particular, the oxidizing component.

SUMMARY OF THE INVENTION

An object of the invention is to establish a viable, cost-effective and environmentally acceptable method of and apparatus for reclamation of the major ingredients from waste solid propellants.

Another object of the invention is to provide an improved method of and apparatus for waste solid propellant size reduction in order to increase the specific surface area of the waste propellant for efficient leaching both in the macerator and in subsequent leaching stages.

Still another object of the invention is to provide for the maceration and simultaneous dissolution of waste solid propellant in order to promote expeditious removal of a desired oxidizing ingredient from the waste propellant.

A further object of the invention is to provide a closed loop means and apparatus for ammonium perchlorate reclamation with little or no waste effluent streams to pollute either air or water.

Another object of the invention is to provide means and method in a hydraulic waste propellant macerator for the counter-current extraction of desired ingredients such as ammonium perchlorate from waste solid propellant.

A further object of the invention is to provide for the elimination of the hazards heretofore associated with the disposal of waste solid propellants.

In accomplishing these and other objectives of the present invention, there is provided a method of and apparatus for hydraulic maceration including the steps of feeding waste solid propellant into a perforated basket and agitating the waste propellant in the basket while subjecting the propellant to the cutting and slicing action of high pressure water jets, thereby shredding the propellant and forcing it out of the basket through the perforations therein.

In another and preferred embodiment of the invention, there is provided a hydraulic macerator comprising an elongated rotating cylindrical drum that is used for waste solid propellant size reduction and counter-current extraction of ammonium perchlorate. Waste solid propellant is charged into the macerator and a concentrated extract solution and an AP depleted binder residue are discharged. The propellant is charged into the macerator through a feed chute and into a perforated basket where high pressure water jets cut the propellant into small pieces and extract the AP into solution. The propellant residue is conveyed to the discharge end of the macerator by a series of helical flights. The helical flights also provide individual compartments or contact stages for a counter-current extraction and washing of the AP from the residue with recycle solvent. The AP depleted residue may be dewatered in a basket centrifuge that may be located at the discharge end of the macerator. The macerator may be operated at a process temperature ranging from 80° F. to 180° F., a rotational speed of 5 revolutions per minute (RPM), and a water pressure of 1,000 pounds per square inch gauge (psig). These and other features of the present invention will be better understood and appreciated from the following detailed description of preferred embodiments thereof.

BRIEF DESCRIPTION OF THE DRAWINGS

FIG. 3 is a side elevation of another embodiment of the hydraulic macerator of the present invention used for waste solid propellant size reduction and counter-current extraction of ammonium perchlorate;

DESCRIPTION OF THE PERFERRED EMBODIMENT

Figure 2:
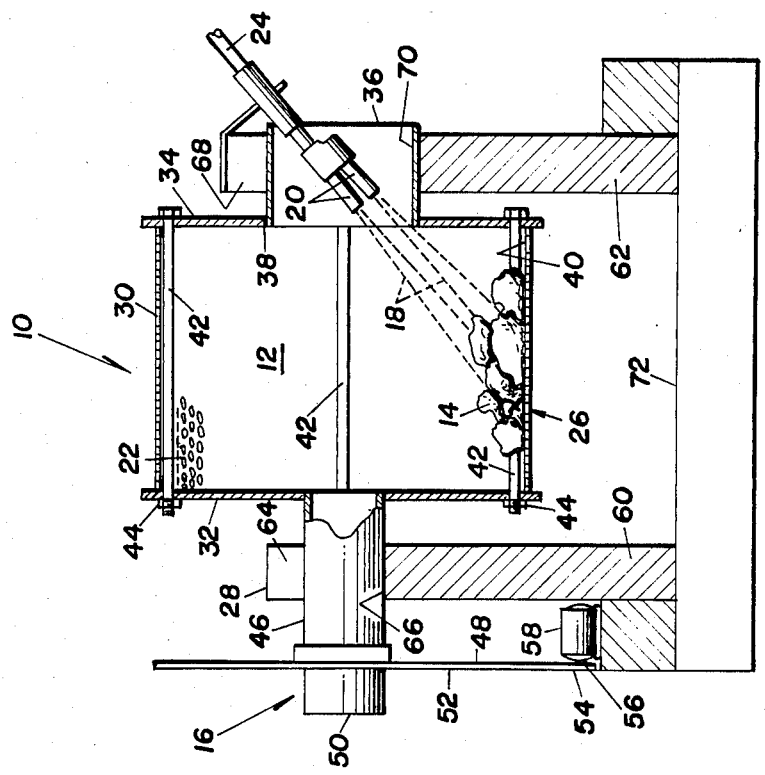
FIG. 2 is a sectional view of the hydraulic macerator taken along the lines 2—2 of FIG. 1.

Many solid propellants comprise metallic particles such as aluminum powder, and an oxidizer, such as ammonium perchlorate, which are interspersed in a combustible binder material, or matrix, the latter generally being in the liquid form when the metal and oxidizer are mixed therewith and being subsequently cured to the solid state in a motor case. Ammonium perchlorate is one of the most widely used oxidizer materials in solid propellants. In accordance with the method and apparatus of the present invention, the solid propellant is macerated and the ammonium perchlorate is dissolved, thereby facilitating ammonium perchlorate recovery. It should be understood, however, that the invention is not limited to the maceration of solid propellants containing ammonium perchlorate, the principles of the invention being applicable to the recovery of other oxidizers that are commonly employed in solid propellant, e.g., potassium perchlorate, sodium perchlorate. It could be used on any materials that are semihard and contain soluble components such as sugar beets (sugar extraction), sunflower seed (oil extraction), and soft ore leaching (i.e. copper carbonate with dilute $H_2SO_4$).

In cured solid propellants, individual crystals of oxidizer are surrounded by the matrix material, which, usually is, insoluble in water. Consequently, although many oxidizers utilized in solid propellants are soluble in water, the oxidizer contained in fragments of solid propellant discarded as waste cannot be dissolved out of the propellant merely by being placed in water.

Most solid propellants comprise an elastomeric hydrocarbon binder containing from about 75% to 89% of solid consisting of oxidizer and particulate metal such as aluminum or zirconium interspersed in the binder. The oxidizer is generally present in an amount from 55% to 85% by weight and the metal powder from 0% to 30% by weight of the propellant. As previously mentioned, one of the most commonly used oxidizers is ammonium perchlorate.

The binder component of the propellant may include an elastomeric hydrocarbon, curing ingredient, and plasticizer. Preferred binders for solid rocket propellants are elastomeric hydrocarbon polymers formed by the chain extension and cross-linking reactions of functional liquid polybutadiene polymers. Such polymers may include carboxy-terminated polybutadiene (CTPB) cured with imines or epoxides, polybutadiene acrylonitrileacrylic terpolymers (PBAN) cured with epoxides and hydroxy-terminated polybutadiene (HTPB) cured with diisocyanates. PBAN polymers are being utilized as the binder for the propellant for the Space Shuttle.

The binder composition may also contain a minor amount below 10% of various additives such as cure promoters, stabilizers, burning rate accelerators, thixotropic control agents, or reactive polymer modifiers such as one or more diols or polyols. The isocyanate is generally present in at least an equivalent amount sufficient to react with the hydroxy prepolymer and hydroxyl substituted modifiers.

The current Space Shuttle Baseline Propellant has the approximate composition given in the following TABLE 1:

TABLE 1

| Ingredient | Percent by Weight |
|---|---|
| solids | 86.00 |
| AP | 69.60 |
| Al | 16.00 |
| $Fe_2O_3$ | 0.40 |
| PBAN* | 14.00 |

*(cured with an epoxy (DER-331))

Figure 1:
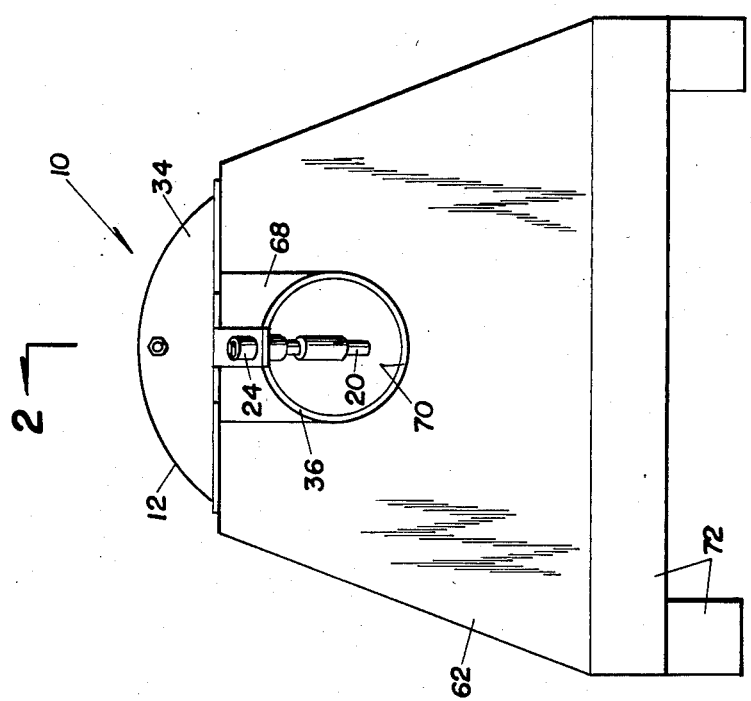
FIG. 1 is an end elevation of an embodiment of the hydraulic macerator according to the present invention illustrating the waste solid propellant feed end of the macerator.

An embodiment of the hydraulic macerator is shown in FIGS. 1 and 2. The macerator there shown is indicated generally by the reference numeral 10 and includes a rotatable perforated member or basket 12 for receiving a quantity of waste solid propellant 14 to be macerated. As the basket 12 is rotated, the pieces or chunks of waste propellant 14 therein are subjected to a tumbling or agitating action. For rotating the basket 12 the macerator 10 includes a drive system indicated at 16 that is operatively associated therewith. High pressure jets 18 of a liquid solvent such as water that issue from nozzles 20 and are directed at the waste solid propellant 14 within the basket 12 shred the waste propellant 14 and forces it through the perforations 22 in the basket 12. Preferably, agitation of the waste propellant 14 takes place concurrently with the exposure thereof to the high pressure water jets 18. For providing the high pressure water jets 18, water at a pressure of about 1,000 psig may be delivered to the nozzles 20 from a pipe 24.

The hydraulic macerator 10 includes an operational structure 26 and a support structure 28. The basket 12 forms a key member of the operational structure 26 and comprises a cylinder 30 having perforations 22 therein. At one end cylinder 30 is closed by a vertical end wall 32. At the other end thereof, cylinder 30 is closed by a vertical end wall 34. A cylindrical feed chute 36 is provided in an opening 38 in end wall 34. Desirably, opening 38 is centrally located with respect to end wall 34, as shown. The waste solid propellant 14 is fed into the basket 12 and lands on the interior surface 40 thereof. A plurality of bars 42 extend along the length of cylinder 30 adjacent interior surface 40, parallel to the longitudinal axis of cylinder 30, and hence, of basket 12. Bars 42 extend through the end walls 32 and 34. Fastening means 44 such as nuts, nuts and washers or lock washers, hold the bars 42 in place while also holding the cylinder 30 and end walls 32 and 34 together. Other fastening means such as welding may be used to attach the end walls 32 and 34 to the cylinder 30. In a preferred embodiment, even with such alternative fastening means, the bars 42 would be included since they act to additionally agitate the waste solid propellant within the perforated basket 12 during operation of the macerator 10. The operational structure 26 of macerator 10 further includes a horizontal drive shaft 46 that is attached to the center of the end wall 32 for rotation of the basket 12. The shaft 46 is attached to the end wall 32 so that the basket 12 can be rotated about its longitudinal axis. A driven pulley (not shown) attached to the free end 50 of the drive shaft 46 is operatively connected by a drive belt 52 to a driver pulley (not shown) that is attached to the output shaft 56 of an air motor 58. The locations of the driven and driver pulleys behind belt 52 are shown at 48 and 54 respectively in FIG. 2. Compressed air provides the motive force for the air motor 58. A hydraulic power source may also be used, if desired. The use of compressed air or hydraulic power instead of an electrical source reduces the explosion and fire hazard accompanying the processing of active waste solid propellant. A pair of support members 60 and 62 of the support structure 28 support the perforated basket 12. Support member 60 is located intermediate the end wall 32 and the driven pulley 48 and receives the drive shaft 46 in an upward facing U-shaped channel 64. The drive shaft 46 may rotate directly on the interfacing surface 66 of the U-shaped channel 64. If desired, however, a friction reducing material such as trifluoroethylene or a suitable roller bearing means (not shown) may be placed between the rotating drive shaft 46 and the interfacing surface 66 of the channel 64. The other support member 62 is located adjacent end wall 34 and also includes an upward facing U-shaped channel 68 having an interfacing surface 70 for receiving the cylindrical feed chute 36 that is attached to the center of end wall 34 and to the feed inlet opening 38 in the end wall 34. Waste solid propellant 14 to be macerated is fed into the perforated basket 12 through the feed chute 36. A common longitudinal axis runs through the drive shaft 46, the perforated basket 12, and the feed chute 36 so that the basket 12 is rotated about its longitudinal axis. In FIGS. 1 and 2 the hydraulic macerator 10 is shown resting on a platform or skid 72.

High pressure macerating jets 18 of water are provided by a plurality of high pressure water nozzles 20 that are attached to the support structure 28 adjacent the inlet opening of the perforated basket 12. In a preferred embodiment, the high pressure nozzles 20 are mounted at a 10 o'clock position relative to the axis of rotation of the feed chute 36 for directing high pressured jets 18 of water onto the bottom of the perforated basket 12 for shredding the waste propellant 14 therein. A high pressure supply line (not shown) is connected to the pipe 24 for providing the required high pressure water jets 18. It is noted that the liquid supplied to nozzles 20 may be either water under high pressure or a recycled solution of water and ammonium perchlorate under high pressure.

In a preferred embodiment, the feed chute 36 comprises an eight inch diameter pipe welded to end wall 34. All wetted parts of the macerator 10 desirably are constructed of stainless steel (316 and 347) or other materials that have a history of service in similar, corrosive environments. Shaft seals may be protected from crystallization by a fresh water purge. When required, any gauges used to monitor macerator performance should be protected from corrosion by diaphram gauge isolators.

While not shown in FIGS. 1 and 2, it will be understood that a splash shield may be provided in circumferential surrounding relation with basket 12 to prevent the materials being processed therein from flying and splattering in all directions out of the basket 12. Such a splash shield, in the embodiment of FIGS. 1 and 2, would be held stationary with respect to the basket 12 and have a suitable opening adjacent a lower region of basket 12 for allowing the material that passes through the perforations 22 in basket 12 to fall into a receptacle (not shown) that may be placed beneath the basket 12 for receiving the processed material.

In operation, waste propellant 14 to be macerated is fed into the perforated member or basket 12 and agitated within the basket 12 while being subjected to the high pressure jets 18 of water. According to this method, the waste propellant 14 is shredded and forced out of the basket 12 through perforations 22. In one embodiment of the invention, it has been found that in excess of 150 pounds of waste propellant per hour can be macerated with the eventual recovery of 100 pounds or more of AP with subsequent processing. As noted hereafter, the hydraulic macerator 10 may operate with jets 18 of high pressure water at a temperature of 160° F. for providing propellant size reduction. The hot water softens the propellant and makes it easier to cut. Also, hot water expedites the formation of solution of ammonium perchlorate. In addition to size reduction, the hydraulic macerator 10 provides the initial contact stage for AP removal.

As illustrated in FIGS. 3-10, there is provided an embodiment of the present invention wherein waste propellant size reduction and counter-current extraction processes are consolidated into a single elongated cylinder or cylindrical drum 74 having a horizontal longitudinal axis 76. Cylindrical drum 74 is supported for rotation about axis 76 by four rollers or wheels 78 which are suitably supported on relatively fixed means for rotation and upon which drum 74 rests, with two of the rollers 78 being positioned in spaced relationship along the length of drum 74 on one side of axis 76 and the other two rollers 78 being positioned in spaced relationship along the length of drum 74 on the other side of axis 76. The rollers 78 on one side of drum 74 as shown in FIG. 3, are driven by a hydraulic motor 80 by means of tandemly connected shafts 82, 84 and 86 that interconnect the rollers 78 on the said one side of drum 74. The rollers 78 on the other side of drum 74 rotate in an idle manner as they support drum 74 for rotation. For constraining the cylindrical drum 74 against longitudinal shifting during the rotation thereof, there desirably is provided two circumferentially extending U-shaped tracks 87 on the external surface of drum 74 that register with rollers 78, as shown in FIG. 3. The rate of rotation of drum 74, in a preferred embodiment, is 5 RPM.

Figure 5:
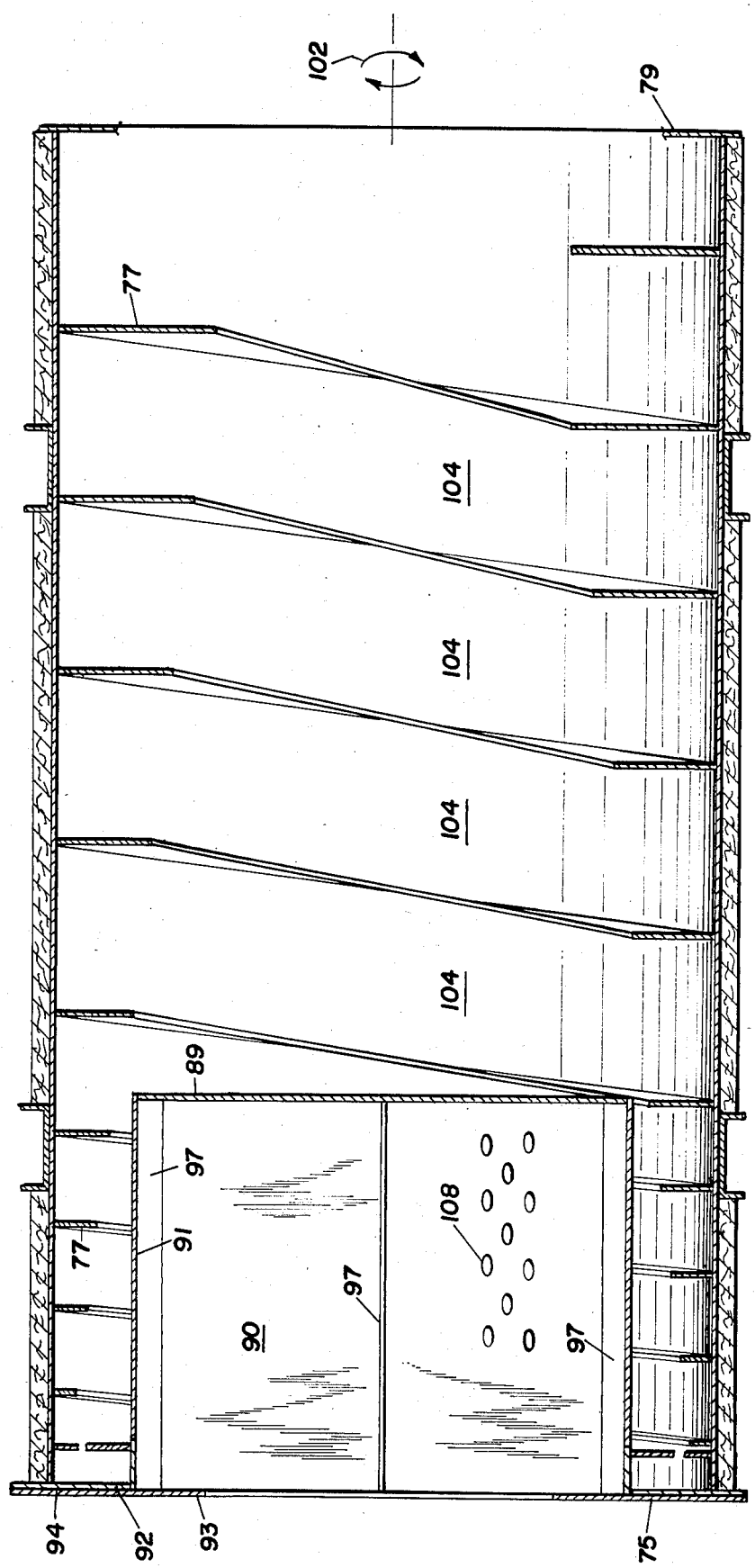
FIG. 5 is a cross-sectional view of the macerator drum taken along the lines 5—5 of FIG. 4.

Placed centrally within the end of cylindrical drum 74 at the feed or left hand end 75 thereof, as seen in FIG. 5, is a perforated basket 90. While basket 90 may be suspended within drum 74 in any suitable manner, it is shown in FIG. 5 as being suspended therein by means of welding a peripheral flange 92 on the open end of basket 90 to an outwardly projecting peripheral flange 94 that extends from end wall 93 on the left end of drum 74.

Basket 90 includes a solid circular, generally vertical wall 89 and an attached cylindrical, perforated side wall 91, the side wall 91 and the side wall 91 and defining a basket chamber, and the side wall 91 and an opening in end wall 93 of drum 74 defining a waste solid propellant inlet. The outside diameter of basket 90 is less than the inside diameter of drum 74 less the height thereat of a helical flight 77 that projects from the interior surface of drum 74 into the interior chamber thereof. With this arrangement the interior surface of drum 74 serves a splash shield thereby making unnecessary the use of a separate splash shield as in the FIGS. 1 and 2 embodiment of the invention. Basket 90 desirably also includes a plurality of circumferentially spaced apart bars 97 that are fixed in any suitable manner to the interior surface of side wall 91 for stiffening the perforated side wall 91 and agitating the waste solid propellant therein as the perforated basket 90 is rotated.

Figure 4:
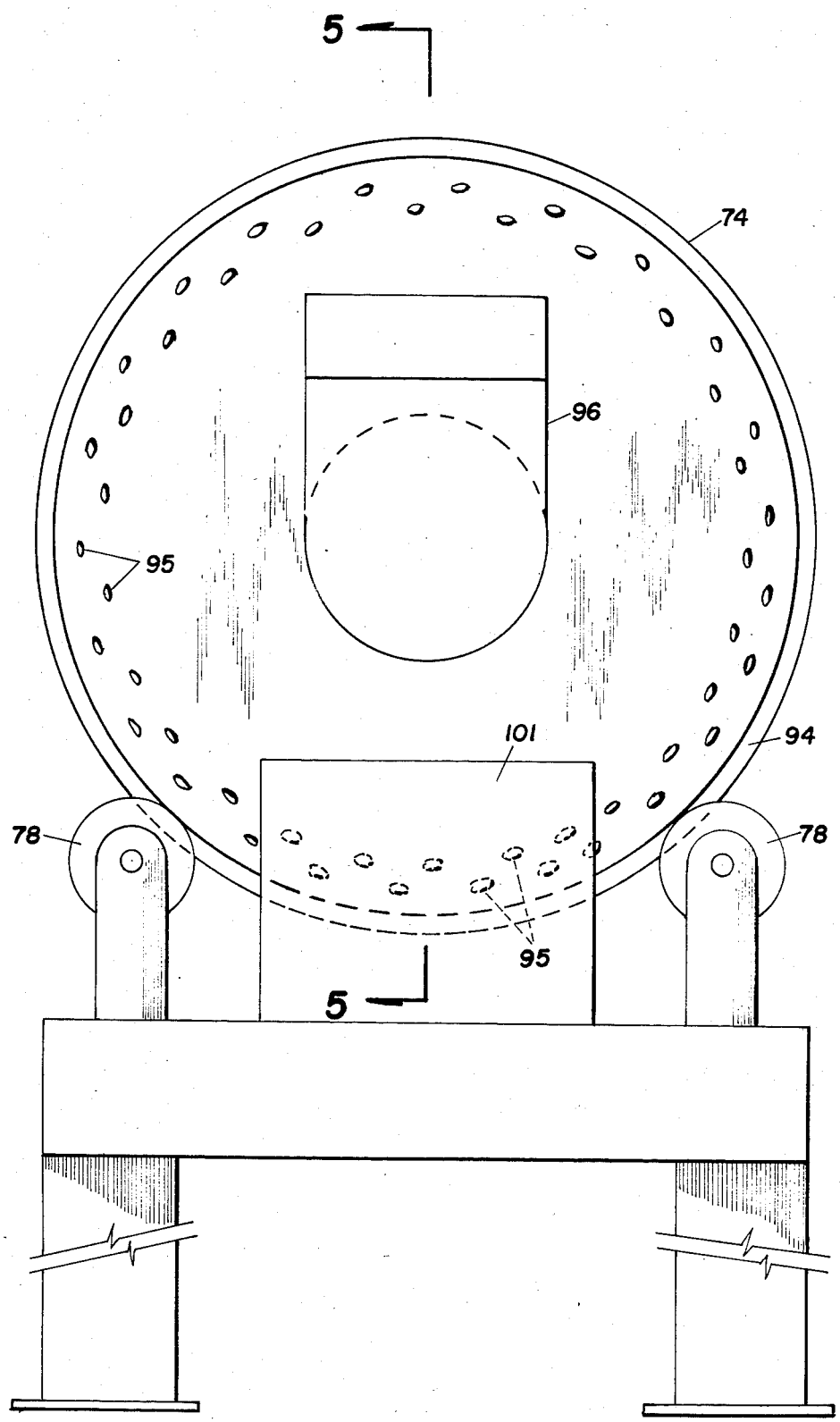
FIG. 4 is a front elevation of the macerator embodiment of FIG. 3.
Figure 8:
FIG. 8 is an interior view of the macerator of FIG. 3 from the feed end showing partially macerated propellant.
Figure 10:
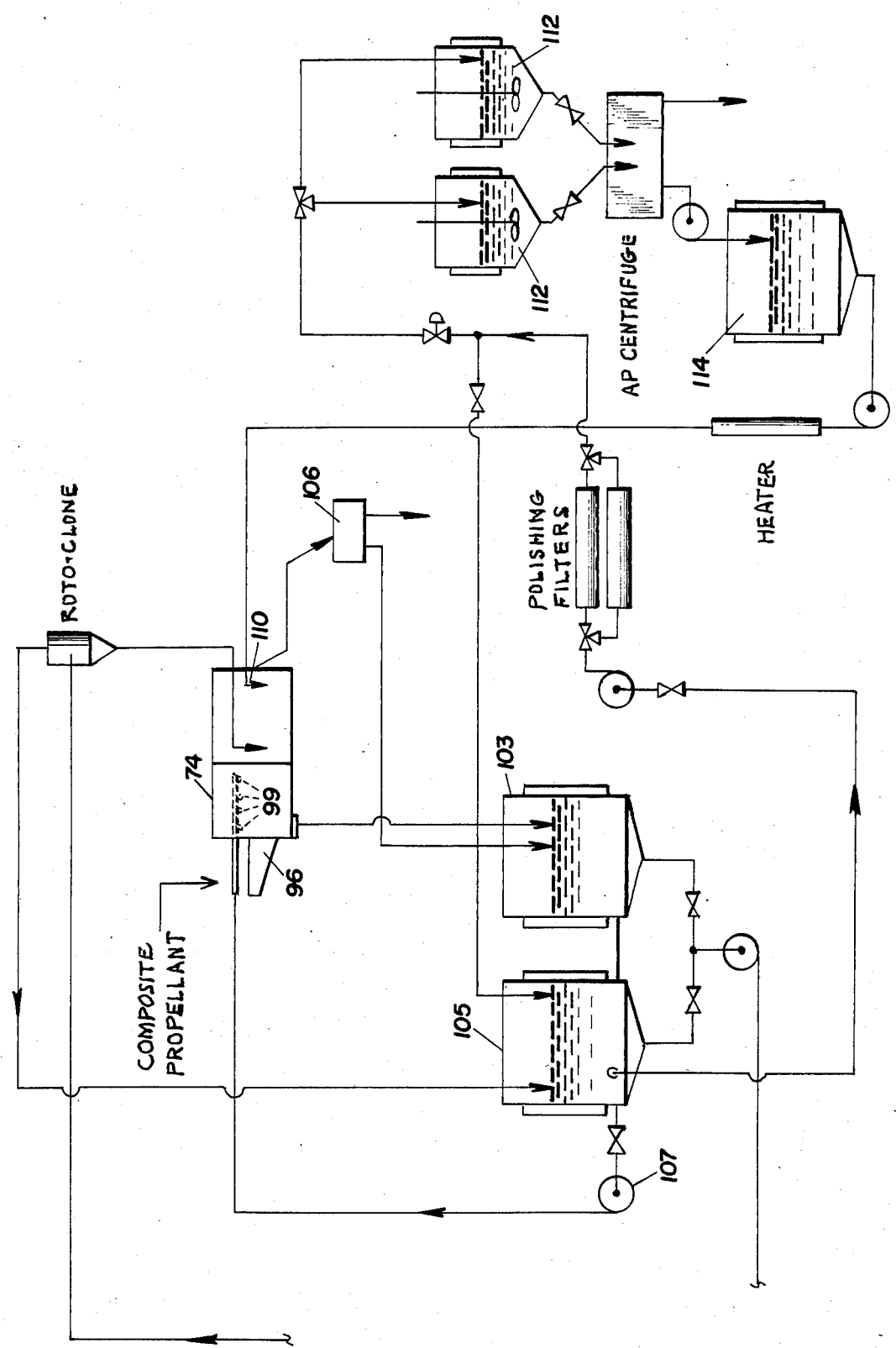
FIG. 10 is a schematic diagram of a flow circuit for the extraction of ammonium perchlorate from waste propellant in accordance with the invention.

Propellant 100 to be macerated is charged into the slowly rotating basket 90 through a feed chute 96. High pressure jets of hot water or other suitable liquid solvent applied at a high pressure of about 1,000 psig to and issuing from a plurality of nozzles 99, as best seen in FIGS. 8 and 10, macerate the propellant 100 and extract the ammonium perchlorate. A plurality of holes 95 provided in the end wall 93 of drum 74 allow the extract or solvent solution containing AP dissolved propellant to drain under the force of gravity into a receptacle 101 that is placed immediately beneath the left end of drum 74, as seen in FIGS. 3 and 4, and from there flows into a leach tank 103, as shown in FIG. 10. The percent AP in the extract solution after one pass through the macerator is about 18%. The solvent solution may be recycled, as by a Rotojet pump 107, from leach tank 103 and a second leach tank 105, and applied at a high pressure of about 1,000 psig to the jet nozzles 99. This recycling action is continued until the percent AP in the recycled solution increase to about 30%. The hot (160° F.) recycled solvent is then applied to crystallizers 112 where it is cooled to about 50° F., to extract the AP therefrom. The resulting "lean solution" may then be introduced into the discharge end 79 of the drum 74 and caused to flow over helical flight 77 thereby to effect a counter-current flow for further washing of the propellant residue and further extraction of AP therefrom.

The helical flight 77 comprises a single helix that extends for substantially the entire length of cylindrical drum 74 with the height thereof sloping, that is, gradually increasing from the feed end 75 of drum 74 to the discharge end 79 thereof. As a result, as drum 74 is rotated clockwise, as indicated by circular arrow 102, at a rate, for example of 5 RPM, lean solution that is introduced into the drum discharge end 79 flows over the helical flight 77 to the feed end 75 of drum 74 for draining into receptacle 101.

Figure 7:
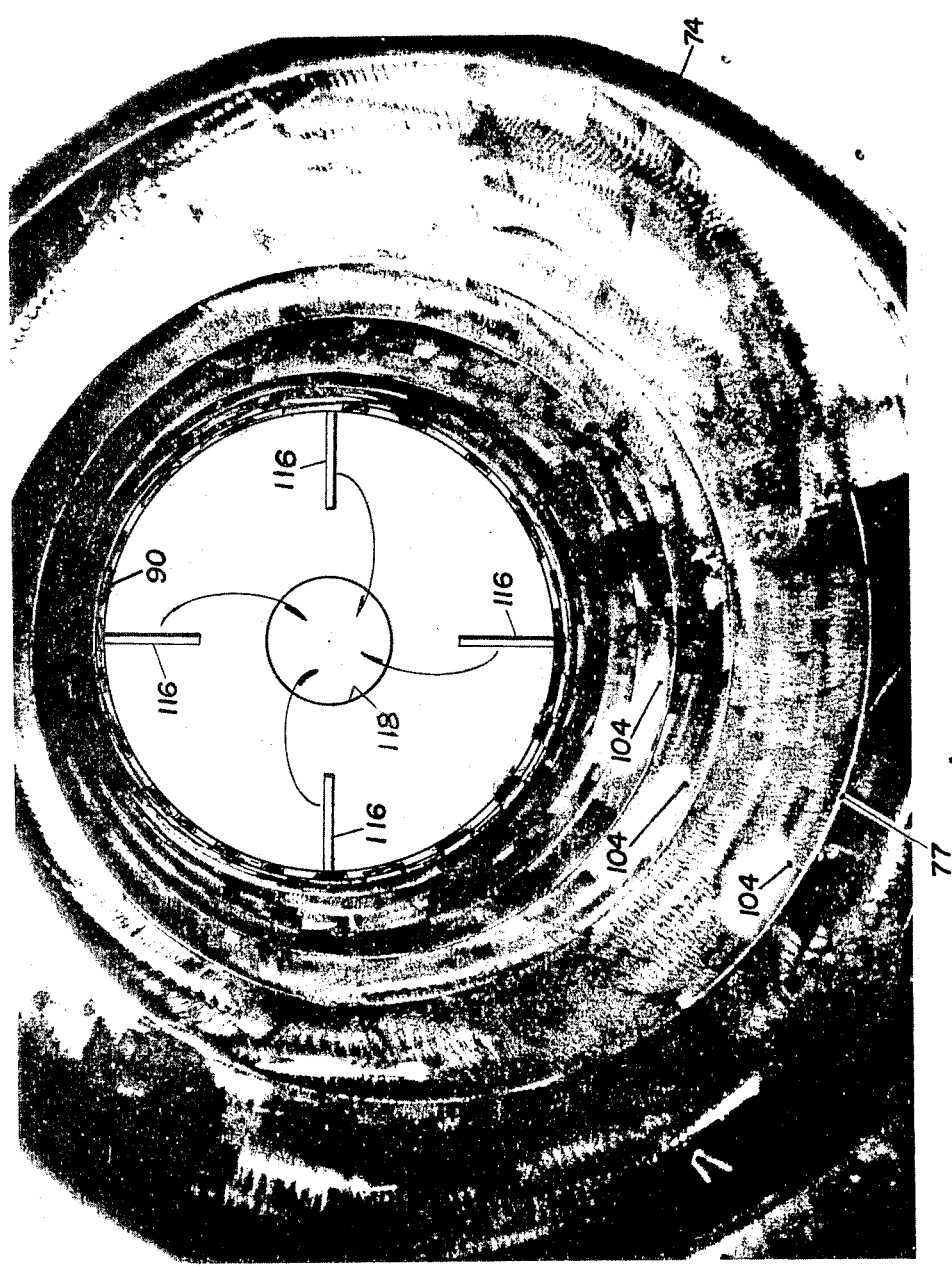
FIG. 7 is an interior view of the macerator of FIG. 3 from the feed end showing the helical conveyor and counter-current wash compartments provided thereby.

Helical flight 77 conveys the depleted propellant residue to the discharge end 79 of drum 74 and segregates the residue and recycled dilute ammonium perchlorate solution into a plurality of counter-current stages 104, as best seen in FIGS. 5 and 7. Residence time in each of the stages 104 is controlled by the rate of rotation of the drum 74.

Figure 9:
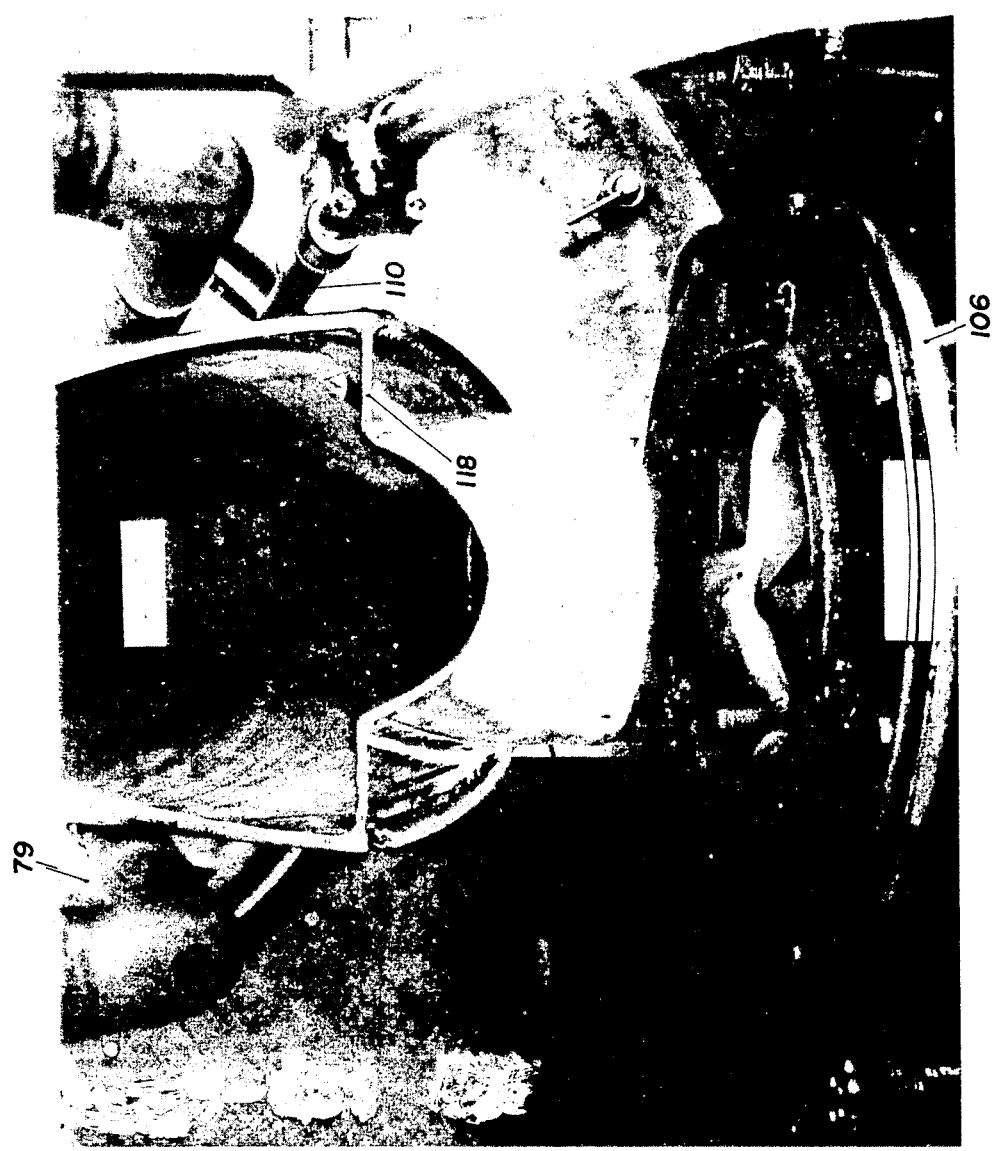
FIG. 9 is an interior view of the macerator of FIG. 3 from the discharge end showing residue discharge from the macerator.

The ammonium perchlorate may be recovered from the concentrated extract solution in the crystallizers 112 which may be batch - continuous crystallizers. A surge tank 114, as shown in FIG. 10, may be used to provide a continuous flow of dilute ammonium perchlorate solution back to the macerating basket 90. The crystallizers and surge tank, per se, form no part of the present invention, and therefore, are not further described herein, being known in the art. The depleted propellant residue may be dewatered in a perforated bowl, basket centrifuge, as shown at 106 at the discharge end 79 of drum 74 in FIG. 9. Lifting arms 116, as seen in FIG. 7, looking aft from the interior of the macerator to the discharge end 79 thereof, are provided for picking up and partially dewatering the propellant residue and then delivering it into a delivery chute 118 from which, as shown in FIG. 9, the residue is delivered to the centrifuge 106.

Figure 6:
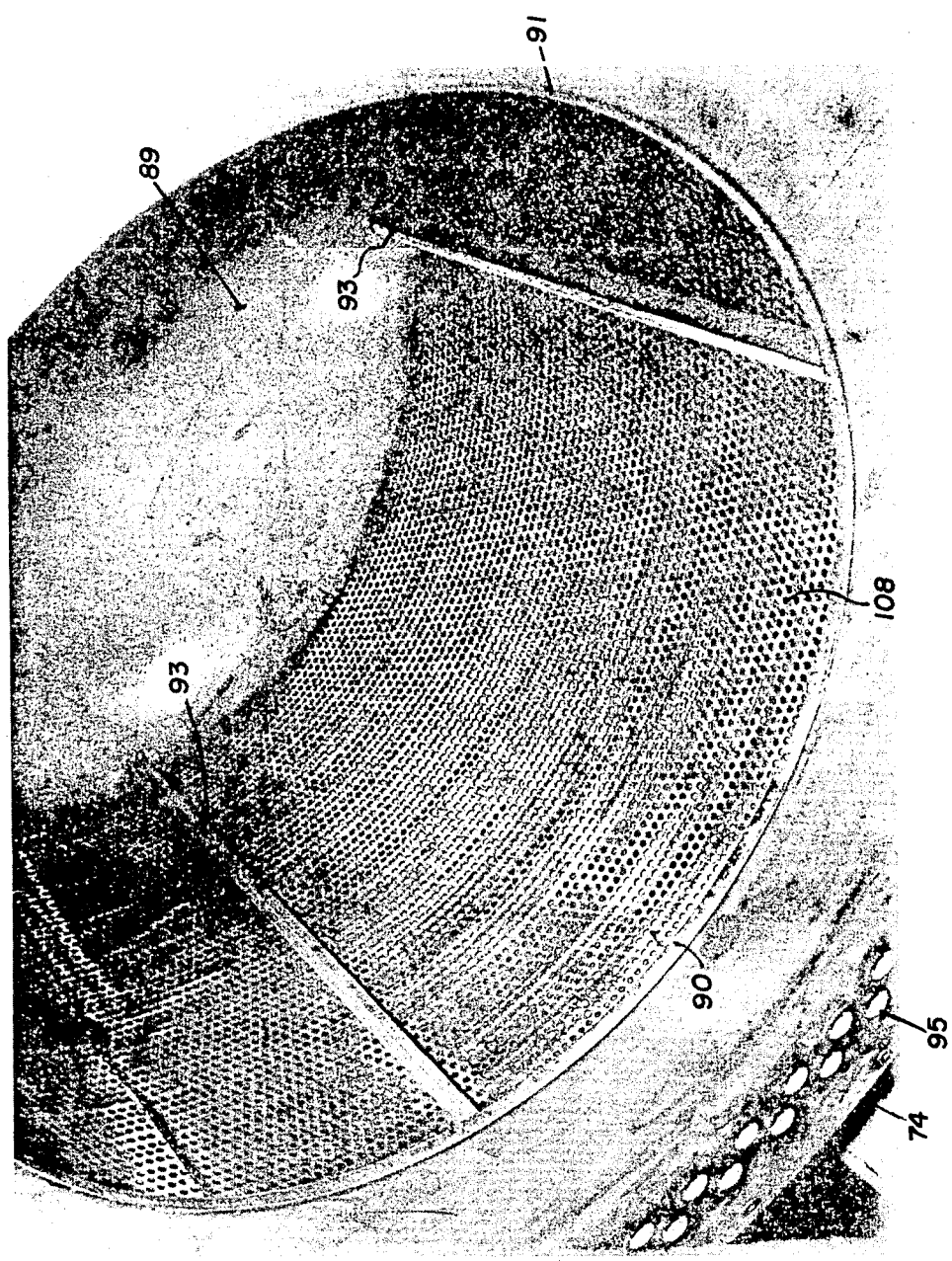
FIG. 6 is an interior view of the macerator of FIG. 3 from the feed end showing the perforated basket.

In a preferred embodiment of the invention, ⅛ inch diameter perforations 108 in basket 90, as seen in FIGS. 5 and 6, were utilized to evaluate the macerator using cured propellant as feed stock. The evaluation results are presented in TABLE II.

Figure 11:
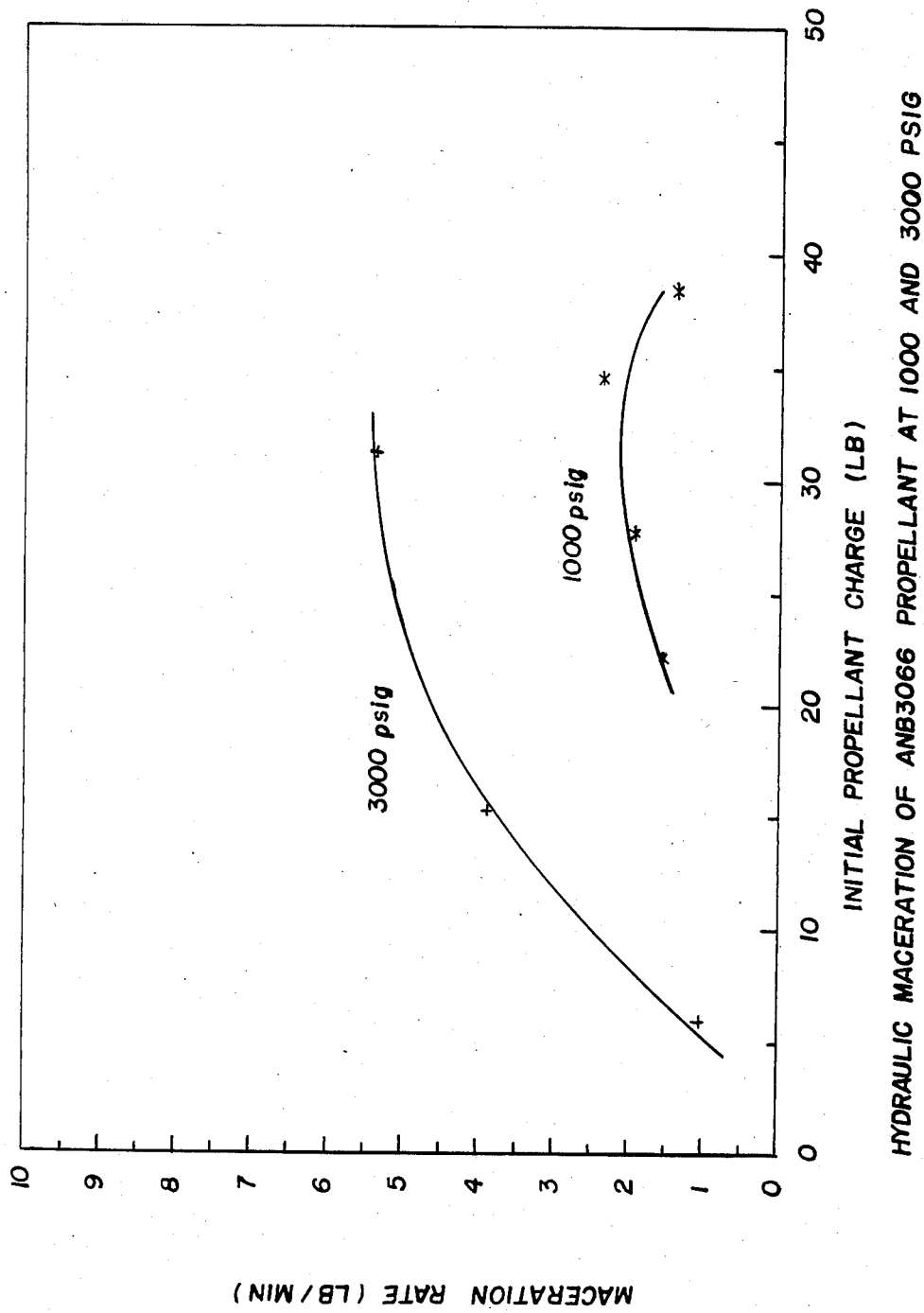
FIGS. 11 and 12 are graphical representations showing the performance of the invention embodiment of FIGS. 3-9.
Figure 12:
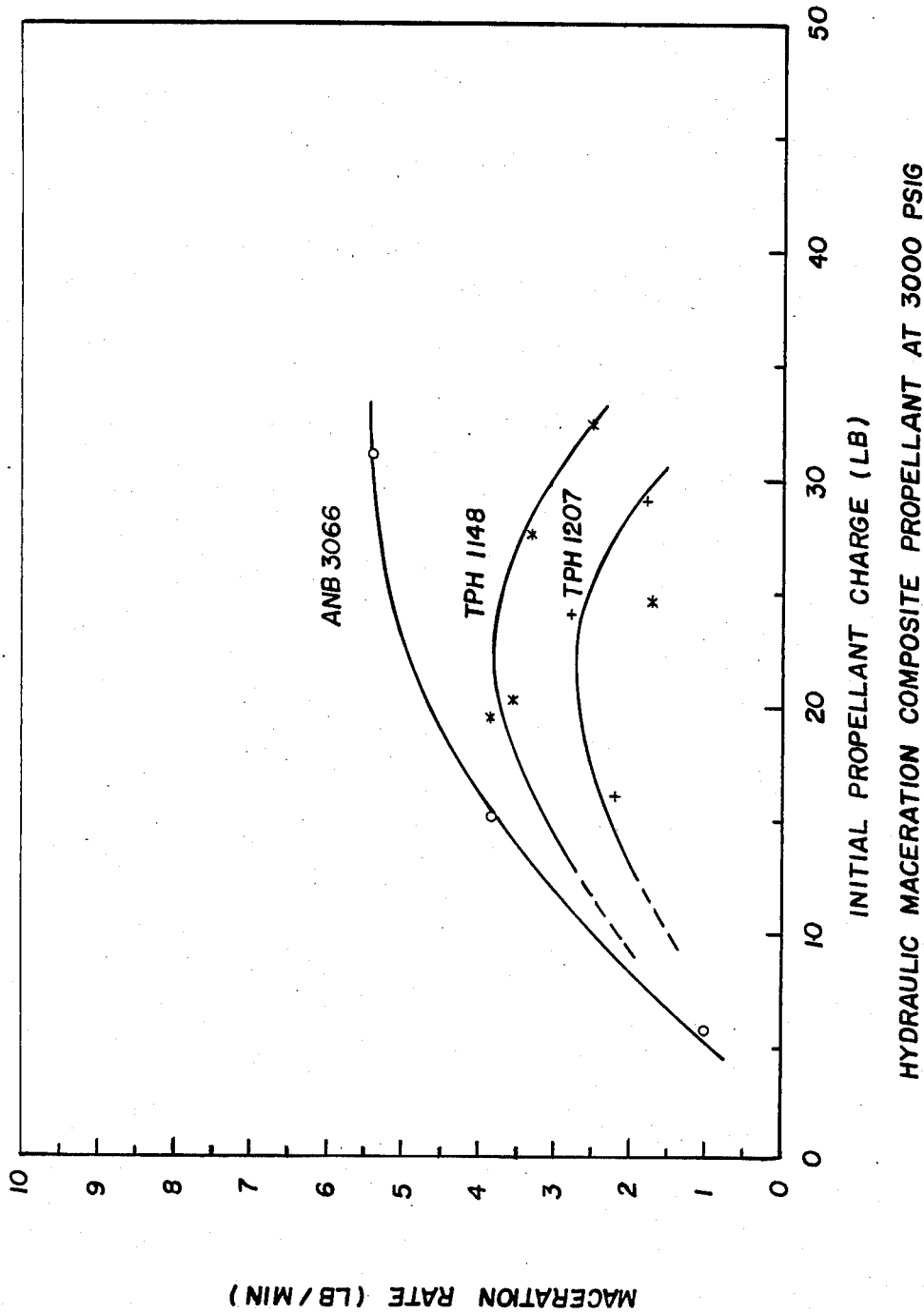

Performance curves for a preferred embodiment of the invention are represented in FIGS. 11 and 12. These curves represent data obtained from performance of a preferred embodiment. It will be noted that the production rate of macerated propellant is a function of jet pressure, propellant type and propellant charge for a given macerator embodiment. Jet pressures of 1,000 and 3,000 psig were used for the evaluation. In order to maintain a desired production rate of 150 pounds of propellant per hour, it is expected that the number of nozzles used for the high pressure water jets 98 will have to be increased from the two used for the evaluation to four or more nozzles for a larger macerator. It is believed that the hydraulic macerator of the present invention produces macerated waste propellant with a specific surface area in excess of 200 square inches per pound.

In further detail, the method of hydraulic maceration of waste propellant utilizes the ability of high pressure water jets to cut solid propellants. As shown by the method of the present invention, bulk waste propellant samples charged into the perforated basket 12 of FIG. 2 or the basket 90 of FIG. 5 are cut into small pieces by the high pressure jets directed into the drum. The small pieces are forced through the perforated basket wall, possibly for further processing. The water that is recovered after such processing may be recycled to the high pressure pump for reintroduction into the macerating basket by way of the high pressure water jets. It should be apparent to one skilled in the art that the process variables for the above-described method and apparatus of the present invention include perforation size, liquid pressure, liquid temperature, liquid flow rate, nozzle size, nozzle type, number of nozzles, and the mass of the propellant charge.

The macerator evaluations (refer to FIGS. 11 and 12) were obtained during the maceration of three composite class 1.3 propellants, designated in Tables II, III, and IV as TP-H1207, TP-H1148, and ANB-3066. The propellants respectively are: (1) MX first stage TP-H1207 (HTPB/AL/AP); (2) Space Shuttle TP-H1148 (PBAN/AL/AP); and (3) Minute Man third stage ANB-3066 (CTPB/AL/AP). The results of the evaluation are summarized in TABLES III and IV and FIGS. 11 and 12. It will be seen that a significant amount of ammonium perchlorate may be extracted from the propellant by the hydraulic macerator. Yield or AP recovery is summarized in TABLE IV for the maceration results set forth in TABLE III. AP recovery was calculated based on residue analysis according to the following equation:

$$\text{Recovery} = \frac{(C_1)(F) - (C_2)(B_1/B_2)(F)}{(C_1)(F)}$$

where:
F = Propellant Feed

TABLE II

| Propellant | NOZZLE CONFIGURATION | | SCREEN CONFIGURATION | | PROCESS FLUID | | | | | PROPELLANT CHARGE | | OPERATION PRODUCTION | |
| | QUANTITY (EA) | DIAMETER (IN) | PERFORATION (IN) | ROTATION (RPM) | TEMP. (°F.) | AP CONC. (%) | SURFACTANT (%) | PRESSURE (PSIG) | FLOW (GPM) | INITIAL (LB) | FINAL (LB) | TIME (MIN) | RATE (LB/MIN) |
|---|---|---|---|---|---|---|---|---|---|---|---|---|---|
| ANB 3066 | 2 | .085 | .125 | 20 | 180 | 0 | 0 | 1,000 | 9 | 32.3 | 8.0 | 11 | 2.18 |
| TP-H1148* | 2 | .085 | .125 | 20 | 180 | 0 | 0 | 1,000 | 9 | 24.3 | 2.0 | 3 | 7.43 |

*UNCURED PROPELLANT $C_1$ = AP Concentration in Feed
$C_2$ = AP Concentration in Residue
$B_1$ = AL Concentration in Feed
$B_2$ = AL Concentration in Residue It is believed to be apparent from the foregoing analysis that the hydraulic macerator method and apparatus of the present invention allows substantial recovery of AP when fresh water and dilute AP solutions are used as the process water. For the evaluation runs of TABLE III, AP recoveries of 89.4% to 97.7% were calculated. Thus, in accordance with the present invention, a method and apparatus for the reclamation of propellant ingredients from waste propellant has been provided. Both the method and apparatus are economical, conserve energy and appeal ecologically. Although open pit burning of waste propellant is inexpensive, the method and apparatus of the present invention is particularly attractive because the presence of a large amount of uniform composition waste propellant lends itself to the design and construction of apparatus to recover the ingredients thereof in a volume great enough to pay for the investment. Ingredient recovery from Space Shuttle waste propellant alone is anticipated to have a value of over 1.5 million dollars and should conserve over 100 million kilowatt hours of energy over the remaining life of the Space Shuttle Program.

residue. Therefore the objectives of hydraulic maceration and significant AP dissolution are both met by the method and apparatus of the present invention.

The method and apparatus of the present invention are primarily directed towards recovering AP from composite waste propellants composed chiefly of AP, aluminum (AL), and a hydrocarbon binder. A significant feature of the present invention is that the quality

TABLE III

HYDRAULIC MACERATOR EVALUATION

| PRO-PELLANT | NOZZLE CONFIGURATION | | SCREEN CONFIGURATION | | PROCESS FLOW | | | | | PROPELLANT CHARGE | | OPERATING PRODUCTION | |
|---|---|---|---|---|---|---|---|---|---|---|---|---|---|
| | QUAN-TITY (EA) | DIAM-ETER (IN) | PER-FORA-TION (IN) | ROTA-TION (RPM) | TEMP (°F.) | AP CONC. (%) | SUR-FAC-TANT (%) | PRES-SURE (PSIG) | FLOW (GPM) | INI-TIAL (LB) | FI-NAL (LB) | TIME (MIN) | RATE (LB/MIN) |
| TP-H1207 | 2 | 0.085 | 0.25 | 20 | 140 | 0 | 0 | 1000 | 9 | 37.9 | 32.3 | 6 | 0.93 |
| | | | | | 152 | 0 | 0 | 3000 | 14 | 32.3 | 27.5 | 2 | 2.40 |
| | | | | | 152 | 0 | 0.037 | 3000 | 14 | 27.5 | 17.9 | 3 | 3.20 |
| | | | | | 178 | 0 | 0 | 1000 | 10 | 25.0 | 20.2 | 3 | 1.60 |
| | | | | | 184 | 0 | 0 | 3000 | 14 | 20.2 | 9.9 | 3 | 3.43 |
| | | | | | 175 | 0 | 0.037 | 3000 | 14 | 24.6 | 19.8 | 3 | 1.60 |
| | | | | | 172 | 12 | 0.037 | 3000 | 14 | 19.4 | 8.2 | 3 | 3.73 |
| TP-H1148 | 2 | 0.085 | 0.25 | 20 | 160 | 0 | 0.030 | 3000 | 14 | 29.0 | 24.0 | 3 | 1.67 |
| | | | | | 160 | 0 | 0.030 | 3000 | 14 | 24.0 | 16.0 | 3 | 2.67 |
| | | | | | 178 | 0 | 0.030 | 3000 | 14 | 16.0 | 9.8 | 3 | 2.07 |
| ANB 3066 | 2 | 0.085 | 0.25 | 20 | 178 | 0 | 0.030 | 3000 | 14 | 31.0 | 15.1 | 3 | 5.30 |
| | | | | | 178 | 0 | 0.030 | 3000 | 14 | 15.1 | 5.7 | 2½ | 3.76 |
| | | | | | 184 | 0 | 0.030 | 3000 | 14 | 5.7 | 2.8 | 3 | 0.97 |
| | | | | | 169 | 0 | 0.030 | 1000 | 9 | 38.3 | 34.4 | 3 | 1.30 |
| | | | | | 178 | 0 | 0.030 | 1000 | 9 | 34.4 | 27.6 | 3 | 2.27 |
| | | | | | 178 | 0 | 0.030 | 1000 | 9 | 27.6 | 22.0 | 3 | 1.87 |
| | | | | | 180 | 0 | 0.030 | 1000 | 9 | 22.0 | 13.1 | 6 | 1.48 |

TABLE IV

EXTRACTION OF AP IN HYDRAULIC MACERATOR

| PRO-PELLANT TYPE | PRO-PELLANT WEIGHT (LB) | PROCESS WATER | | | SOLUTE TO SOLVENT RATIO | EXTRACT ANALYSIS AP (%) | RESIDUE ANALYSIS | | | AP RE-COVERY (%) |
|---|---|---|---|---|---|---|---|---|---|---|
| | | VOLUME (GAL) | TEMP (°F.) | AP CONTENT (%) | | | $H_2O$ (%) | AP (%) | INSOLUBLES (%) | |
| TP-H1207 | 4.8 | 28 | 152 | 0 | 0.014 | 1.30 | 40.21 | 6.25 | 53.54 | 94.8 |
| | 9.6 | 42 | 152 | 0 | 0.019 | 1.80 | 38.25 | 10.98 | 50.77 | 90.3 |
| | 4.8 | 30 | 178 | 0 | 0.013 | 1.33 | 47.16 | 6.00 | 46.84 | 94.2 |
| | 10.3 | 42 | 184 | 0 | 0.020 | 2.04 | 55.00 | 5.40 | 39.60 | 93.9 |
| | 4.8 | 42 | 175 | 0 | 0.009 | 1.43 | 45.55 | 6.20 | 48.25 | 94.2 |
| | 11.2 | 42 | 172 | 10.7 | 0.129 | 11.19 | 27.99 | 6.80 | 65.21 | 95.3 |
| TP-H1148 | 5.0 | 42 | 160 | 0 | 0.010 | 1.25 | 47.9 | 2.6 | 49.5 | 97.7 |
| | 8.0 | 42 | 160 | 0 | 0.016 | 2.30 | 30.3 | 10.4 | 59.3 | 92.4 |
| | 6.2 | 42 | 178 | 0 | 0.012 | 1.59 | 27.9 | 6.2 | 65.9 | 95.9 |
| ANB-3066 | 15.9 | 42 | 178 | 0 | 0.033 | 2.39 | 43.9 | 11.5 | 44.6 | 90.5 |
| | 9.4 | 35 | 178 | 0 | 0.024 | 1.14 | 52.2 | 8.3 | 39.5 | 92.2 |
| | 2.9 | 42 | 184 | 0 | 0.006 | 0.53 | 51.0 | 6.2 | 42.8 | 94.6 |
| | 3.9 | 28 | 169 | 0 | 0.012 | 2.12 | 56.7 | 7.2 | 36.1 | 92.6 |
| | 6.8 | 28 | 178 | 0 | 0.021 | 1.59 | 62.2 | 6.5 | 31.3 | 92.3 |
| | 5.6 | 28 | 178 | 0 | 0.018 | 2.01 | 57.4 | 7.6 | 35.0 | 92.0 |
| | 8.9 | 56 | 180 | 0 | 0.014 | 1.57 | 60.9 | 8.7 | 30.4 | 89.4 |

The present invention hydraulically macerates waste propellant in order to recover oxidizer in the hydraulic solution. The result is immediate dissolution of the ammonium perchlorate oxidizer and its separation from the residue from the macerated waste propellant. A lean AP solution may be recycled in the hydraulic macerator to further extract more AP from propellant subsequently placed in the macerator. Such a solution may be introduced into the discharge end of the cylindrical drum 74 by means of a pipe 110, as seen in FIGS. 9 and 10, to provide the counter-current for effecting further extraction of AP from the propellant residue. It is noted that such counter-current of lean solution washes over the residue and flows back for discharge through the holes 95 in the peripheral flange 94 of drum 74 and thereby effects a further extraction of AP from the of the AP recovered is equal to or exceeds that of newly purchased AP. The method and apparatus for the present invention produce a recovered AP that meets the specifications required for its reuse by the propellant, blasting, and chemical industry, e.g., for the production of perchlorate acid or other perchlorate based chemicals.

Having described the invention in detail, those skilled in the art will appreciate that modifications may be made to the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A method of hydraulically macerating and recovering soluble component from a solid material that is semihard and contains at least one soluble component comprising:
   feeding the solid material into perforated enclosure means receiving the material,
   holding the solid material in the perforated enclosure means until it is macerated such that it can pass through perforations of the perforated enclosure means,
   agitating the solid material within the perforated enclosure means, and
   exposing the solid material to jets of liquid solvent under a pressure which is equal to at least about 1000 psig as the solid material is agitated to thereby macerate the solid material and force the material through the perforations in the perforated enclosure means as the solid macerated material is macerated and to dissolve the at least one soluble component from the solid material into the solvent.

2. A method of hydraulically macerating a solid material as set forth in claim 1 further comprises removing the macerated material and flowing additional liquid solvent in a direction counter to the direction of flow of the macerated material as it is removed to dissolve additional soluble component from the macerated material into the additional solvent.

3. A method as set forth in claim 2 wherein the solid material is waste solid propellant, the method further comprises providing the liquid solvent such that it has a temperature equal to at least about 160° F.

4. A method as set forth in claim 1 wherein the solid material is waste solid propellant, the method further comprises providing the liquid solvent such that it has a temperature equal to at least about 160° F.

5. A hydraulic macerator for macerating and recovering soluble component from solid material that is semihard and contains at least one soluble component comprising:
   perforated enclosure means for holding the solid material to be macerated such that the solid material is held therein until it is macerated and discharged from said enclosure means through perforations therein;
   inlet means in said enclosure means for receiving the solid material to be macerated;
   means for rotating the enclosure means to agitate the solid material when held within the enclosure means; and
   means for directing and operatively providing jets of liquid solvent into the enclosure means under a pressure which is equal to at least about 1000 psig onto the solid material when held within the enclosure means to thereby macerate the solid material and force the macerated material through the perforations of the perforated outlet means and to dissolve soluble component from the solid material into the solvent.

6. A hydraulic macerator as set forth in claim 5 wherein the hydraulic macerator further comprises means for removing the macerated material and solvent.

7. A hydraulic macerator as set forth in claim 5 further comprises means for removing the macerated material from the hydraulic macerator and means for flowing additional liquid solvent in a direction counter to the direction of flow of the macerated material during its removal from the hydraulic macerator to extract additional soluble component from the macerated material into the additional liquid solvent.

8. A hydraulic macerator as set forth in claim 7 wherein hydraulic macerator further comprises means for extracting the soluble component from the solvent.

9. A hydraulic macerator as set forth in claim 7 wherein the counter flow means includes a cylindrical drum rotatable about a horizontal longitudinal axis and having an interior chamber, a waste propellant inlet end, a macerated propellant outlet end, a fluid inlet means at the macerated propellant outlet end, and a fluid outlet means at the waste propellant inlet end, the enclosure means includes a perforated cylindrical basket disposed in the interior chamber of said drum and rotatable with said drum, the basket is disposed in concentric relation with the drum and has an outside diameter which is less than the inside diameter of the drum and a length which is less than the length of the drum, and the counter flow means further includes a conveyor comprising a helical wall attached to an inner wall of the drum and extending into the interior chamber over generally the length of the drum and decreasing in height from the outlet end to the inlet end for conveying the additional liquid solvent in a direction from the fluid inlet means at the outlet end to the fluid outlet means at the inlet end of the drum in counter flow relation with macerated material discharged through the cylindrical perforated basket and conveyed to the drum outlet end along said helical wall as the drum is rotated to dissolve additional soluble component from the macerated material into the additional liquid solvent.

10. A hydraulic macerator as set forth in claim 5 wherein said enclosure means comprises a perforated basket having a horizontal axis and including a pair of vertical end walls and further comprises means including a plurality of agitator bars extending between said end walls in a direction parallel to the horizontal axis along an interior surface of the basket and connected to the end walls for agitating the solid material in the basket as the basket rotates.

11. A hydraulic waste propellant macerator comprising:
   a rotatable perforated basket means for holding waste propellant to be macerated such that the waste propellant is held therein until it is macerated and discharged from said basket means through perforations therein, said basket means having a horizontal axis and including a first vertical end wall and a second vertical end wall, the first vertical end wall having a central opening for feeding the waste propellant into the basket means;
   cylindrical member means attached to the first end wall about the feed opening for feeding the waste propellant into the basket means;
   a horizontal drive shaft attached to the second vertical end wall for rotating the basket means about its horizontal axis;
   an air motor having an output shaft;
   a drive belt means for transmitting output shaft rotation to the drive shaft;
   a first support means adjacent the first vertical end wall;
   the first support means having a first upward opening U-shaped channel for rotatably receiving and supporting the cylindrical member means as it rotates with the basket means;

a second support means having a second upward opening U-shaped channel means for rotatably receiving and supporting the drive shaft;
   a plurality of nozzle means for directing and operatively providing jets of liquid solvent under a pressure which is equal to at least about 1000 psig into the basket means interior for macerating the waste propellant when held therein and forcing the macerated propellant through the basket means perforations as the propellant is macerated and for dissolving soluble component from the waste propellant into the liquid solvent; and
   means including a plurality of agitator bars extending across the basket means along an interior surface thereof and parallel to the drive shaft and attached at the ends thereof to the vertical end walls respectively for holding the basket means together and for agitating the waste propellant in the basket means as the basket means rotates.

12. A hydraulic waste propellant macerator and soluble component extractor comprises:
   a rotatable cylindrical drum having an interior chamber and including a waste propellant inlet end, a macerated propellant outlet end, a fluid inlet means at the macerated propellant outlet end, and a fluid outlet means at the waste propellant inlet end, the drum being rotatable about a horizontal longitudinal axis;
   a perforated basket means disposed in the interior chamber of said drum and rotatable with the drum for holding waste propellant to be macerated such that the waste propellant is held therein until it is macerated and discharged from said basket means through perforations therein, the basket means including a pair of generally vertical walls and a cylindrical perforated wall extending between and attached to the vertical walls to define a basket means chamber, and the basket means further includes waste propellant inlet means at the drum inlet end for feeding chunks of waste propellant into the basket means, the basket means is concentric with the drum and has an outside diameter which is less than the inside diameter of the drum and a length which is less than the length of the drum;
   a conveyor comprising a helical wall attached to an inner wall of the drum and extending into the interior chamber over generally the length of the drum and decreasing in height from the outlet end to the inlet end for conveying liquid solvent in a direction from the fluid inlet means at the outlet end to the fluid outlet means at the inlet end of the drum in counter flow relation with propellant material discharged through the perforations of the cylindrical wall of the basket means and conveyed to the drum outlet end along said helical wall as the drum is rotated to dissolve soluble component from the propellant material into the liquid solvent;
   a plurality of means for directing and operatively providing jets of liquid solvent under a pressure which is equal to at least about 1000 psig into the basket means to macerate the propellant when held therein and force the macerated propellant through the perforations in the basket means as the propellant is macerated for conveying thereof by the helical conveyor to the drum outlet end and to dissolve soluble material from the waste propellant into the liquid solvent which issues from the jets;
   means for rotating the drum about the horizontal longitudinal axis;
   means for rotatably supporting the rotatable drum; and
   discharge means disposed at the outlet end of the rotatable drum for receiving the macerated waste propellant discharged from the helical conveyor.

13. The hydraulic waste propellant macerator as set forth in claim 12 further comprising:
   means including a plurality of circumferentially-spaced apart longitudinal bars fixed to and extending between the vertical walls along the interior surface of the basket means for stiffening the perforated cylindrical wall and agitating the waste propellant therein as the perforated basket means rotates.

14. The hydraulic waste propellant macerator as set forth in claim 12 in which the drum rotating means further comprises a hydraulic motor for rotating the drum.

15. The hydraulic waste propellant macerator as set forth in claim 12 in which the means for rotatably supporting the rotatable drum comprises a plurality of rollers beneath a plurality of circumferentially-extending U-shaped tracks on the drum's outer surface registering with the rollers thereby constraining the drum against longitudinal shifting during rolling.

16. A hydraulic waste propellant macerator and soluble component extractor as set forth in claim 12 wherein the macerator further comprises means for extracting the soluble component from the liquid solvent.

* * * * *